(12) United States Patent
Lee et al.

(10) Patent No.: US 8,391,636 B2
(45) Date of Patent: Mar. 5, 2013

(54) IMAGE PROCESSING APPARATUS AND METHOD

(75) Inventors: Yu-seob Lee, Yongon-si (KR); Hyun Kang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 939 days.

(21) Appl. No.: 12/481,145

(22) Filed: Jun. 9, 2009

(65) Prior Publication Data

US 2010/0111443 A1 May 6, 2010

(30) Foreign Application Priority Data

Oct. 30, 2008 (KR) .................. 10-2008-0107217

(51) Int. Cl.
*G06K 9/40* (2006.01)

(52) U.S. Cl. ........................................ 382/275

(58) Field of Classification Search .............. 382/275, 382/199, 260, 266, 100; 348/747, 739, 785, 348/786, 806, 556, 557
See application file for complete search history.

(56) References Cited

U.S. PATENT DOCUMENTS

| | | | | |
|---|---|---|---|---|
| 6,970,205 B2* | 11/2005 | Aoki et al. | ..................... | 348/445 |
| 7,454,123 B2* | 11/2008 | Buxton | ......................... | 386/278 |
| 7,701,518 B2* | 4/2010 | Chung et al. | .................. | 348/747 |
| 2006/0242669 A1* | 10/2006 | Wogsberg | ....................... | 725/74 |
| 2008/0063240 A1* | 3/2008 | Keng et al. | .................... | 382/112 |
| 2009/0148062 A1* | 6/2009 | Gabso et al. | .................. | 382/266 |

* cited by examiner

*Primary Examiner* — Yon Couso
(74) *Attorney, Agent, or Firm* — Sughrue Mion, PLLC

(57) ABSTRACT

A broadcast display apparatus and an image processing and outputting method thereof. An image processing and outputting method includes determining whether there is noise on an edge of an original image, and performing image processing for the noise. Accordingly, undesired signals inserted on an edge of an image can be effectively removed.

19 Claims, 7 Drawing Sheets

IMAGE PROCESSING APPARATUS AND METHOD

CROSS-REFERENCE TO RELATED APPLICATIONS

This application claims priority from Korean Patent Application No. 10-2008-0107217, filed on Oct. 30, 2008 in the Korean Intellectual Property Office, the disclosure of which is incorporated herein by reference in its entirety.

BACKGROUND OF THE INVENTION

1. Field of the Invention

Apparatuses and methods consistent with the present invention relate to an image processing, and more particularly, to an apparatus and method for processing an edge of an image.

2. Description of the Related Art

Display apparatuses, especially, televisions have been conventionally using overscanning in order to output an image on a screen. Overscanning is cropping an area of a certain ratio (i.e., the "overscan" or the "overscan area") from an edge of an active area of an original signal image (an original image) and magnifying or stretching the remaining image on a display apparatus. The overscanning has been generally used from when performing analog broadcasting so as to solve the problem that when a broadcasting station or a broadcasting manufacturer produces video, undesired signals are inserted into the edge.

However, overscanning has several problems, such as losing certain data of the input original image. That is, because a certain part of the original image, i.e., the overscan or the overscan area, is cropped, an image which can be viewed by users may become comparatively narrow. Recently, as digital broadcasting has been widespread and a demand for clearer image quality has been increasing, a scanning method not using overscanning ("just scan") has been tried.

In fact, a technology for producing a broadcast signal has been much more enhanced than in the past, but in actuality, producing a perfect signal is still difficult. In particular, since undesired signal may be inserted on an edge of a signal, a solution for this case is required when applying just scan.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An aspect of the present invention provides a solution for a problem occurring when applying just scan.

According to an exemplary aspect of the present invention, there is provided an image processing and outputting method, including determining whether there is noise on at least one edge of an original image, performing image processing for the noise, and outputting the original image in which the noise is processed.

The determining operation may include providing a user with a selectable menu regarding the noise.

The providing operation may include providing the user with a menu for selecting a size of an area having the noise in detail.

The determining operation may include automatically determining the presence or absence of the noise on the edge according to a predetermined criterion.

The automatically determining operation may include determining whether a particular pattern appears in a certain area of the edge.

The processing operation may include converting only the noise into another image data.

The processing operation may include converting a border including the noise into another image data.

The converting operation may include receiving the width of the border from the user.

The converting operation may include gradually increasing or decreasing the chroma of image data on the border.

According to another exemplary aspect of the present invention, there is provided a display apparatus, including a noise determination unit which determines whether there is noise on an edge of an original image, an image processing unit which performs image processing for the noise, and a video output unit which outputs the original image, in which the noise is processed, so as to be displayed on a display unit.

The display apparatus may further include a menu generation unit which provides a user with a selectable menu regarding the noise.

The noise determination unit may automatically determine the presence or absence of the noise on the edge according to a predetermined criterion.

The image processing unit may convert only the noise into another image data.

The image processing unit may convert a border including the noise into another image data.

As described above, according to diverse exemplary aspects of the present invention, an undesired signal in an edge of an image can be effectively removed without damaging data in an original signal, so users can be provided with an improved television viewing environment.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
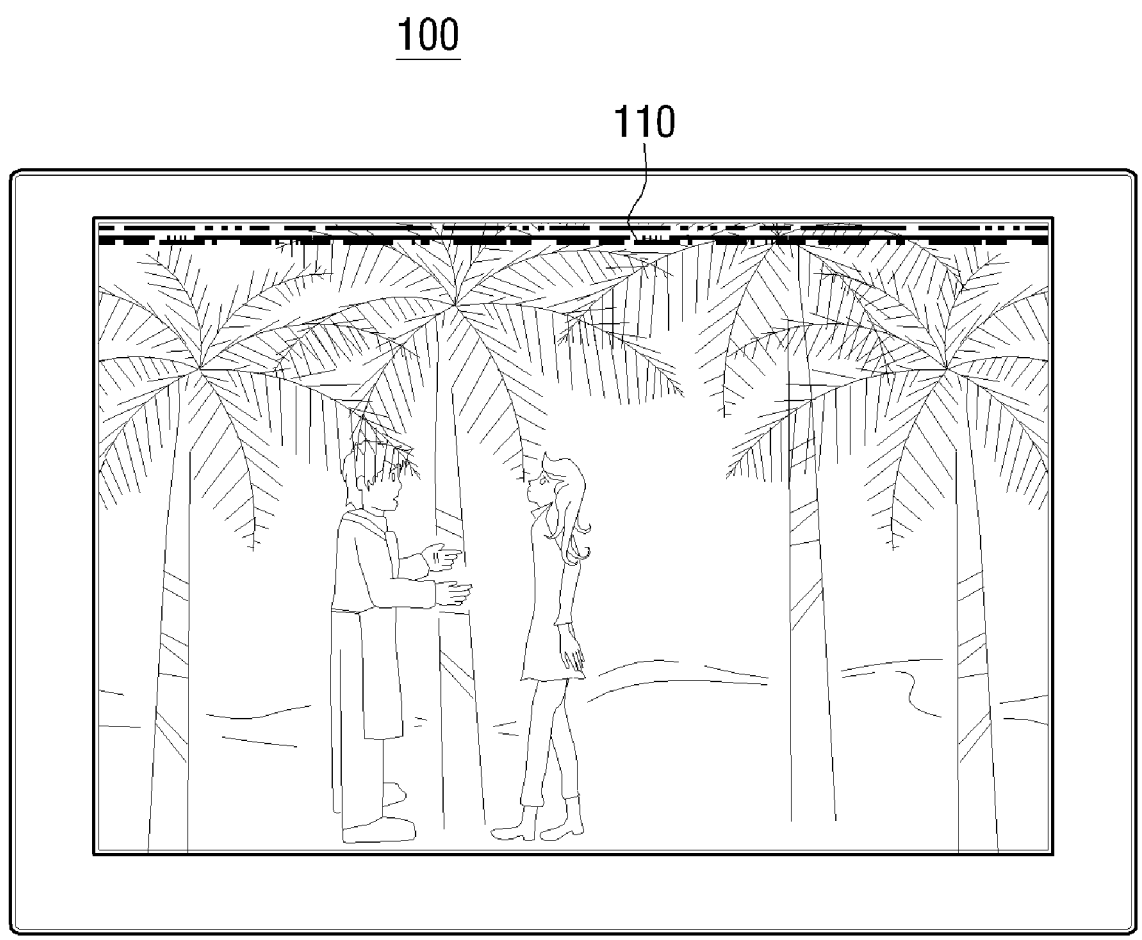
FIG. 1 is an example of an output picture.

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

Figure 2:
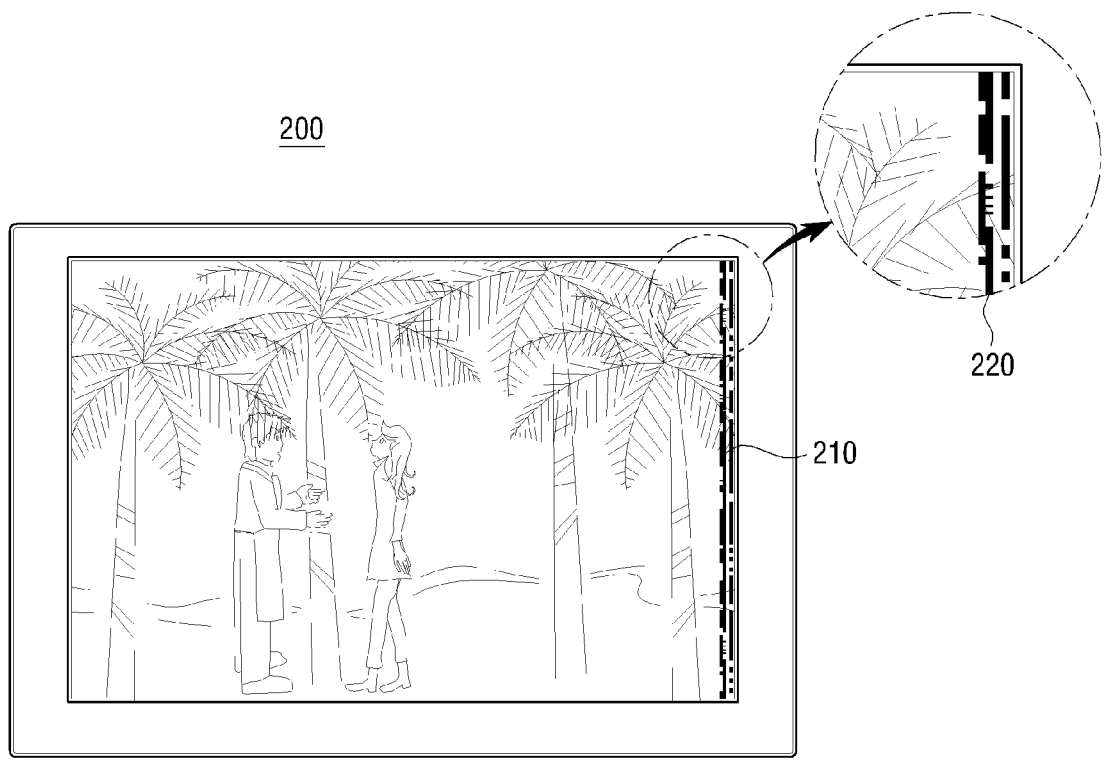
FIG. 2 is another example of an output picture.

FIGS. 1 and 2 illustrate examples of an output picture to be improved according to an exemplary embodiment of the present invention. The display apparatus 100 as illustrated in FIG. 1 may be implemented as a television or a monitor. FIG. 1 illustrates output of the display apparatus 100. More specifically, FIG. 1 illustrates a screen to which "just scan" is applied. In this case, an undesired signal is present on an edge of a signal and appears as noise 110. In FIG. 1, the noise 110 appears on an upper edge of the screen. In this specification, the noise indicates data that the user does not wish to receive, and noise may be interchangeable with other terms such as garbage data.

In FIG. 2, the display apparatus 200 illustrates that an undesired signal is present as noise on the right edge 210 and 220 of the screen.

Figure 3:
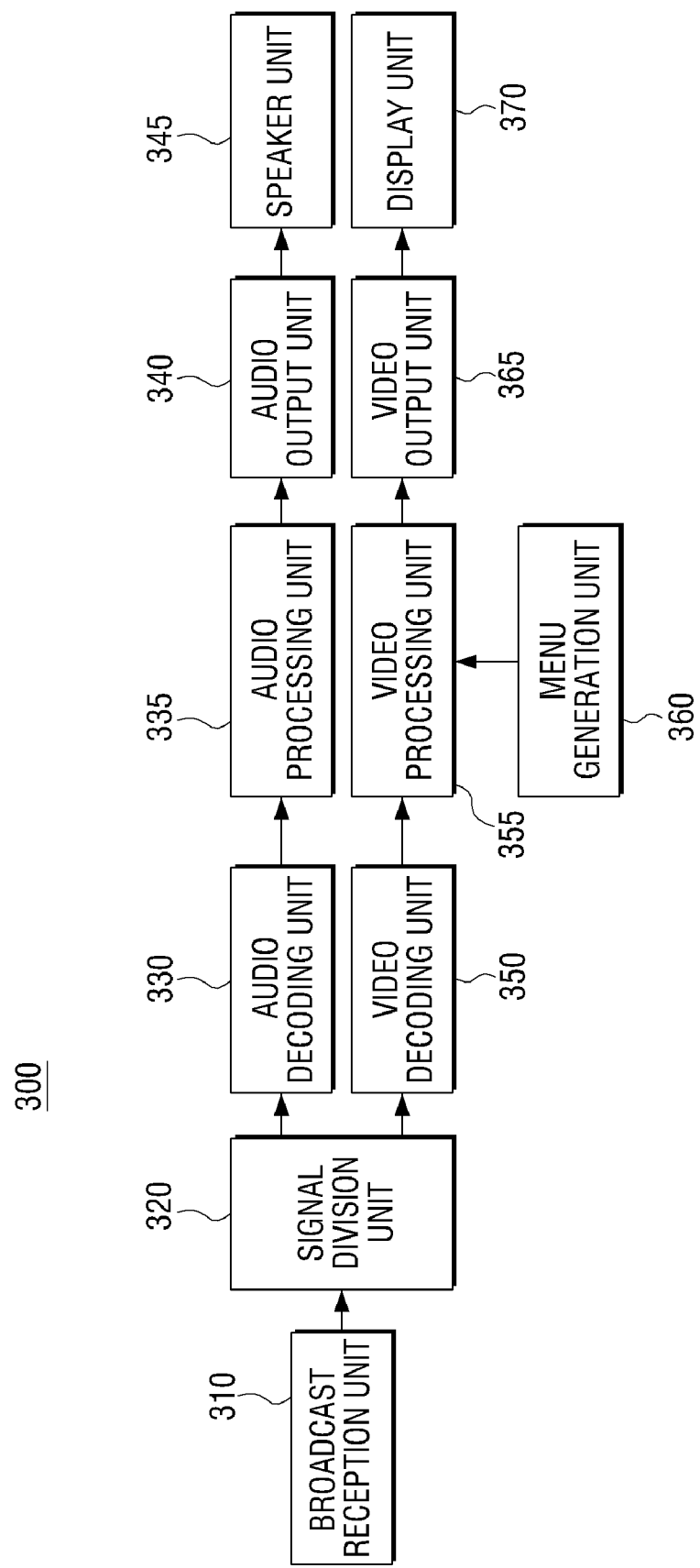
FIG. 3 is a block diagram of a display apparatus according to an exemplary embodiment of the present invention.

FIG. 3 is a block diagram of a display apparatus according to an exemplary embodiment of the present invention. In particular, FIG. 3 illustrates that the display apparatus is implemented as a digital television (DTV).

As illustrated in FIG. 3, a DTV 300 according to an exemplary embodiment of the present invention may include a broadcast reception unit 310, a signal division unit 320, an audio decoding unit 330, an audio processing unit 335, an audio output unit 340, a speaker unit 345, a video decoding unit 350, a video processing unit 355, a menu generation unit 360, a video output unit 365, and a display unit 370.

The broadcast reception unit 310 tunes to one of broadcasts received from a broadcasting station wirelessly or using wire, and demodulates the broadcast.

The signal division unit 320 divides and recombines a broadcast signal output by the broadcast reception unit 310. More specifically, in a digital broadcast, video, audio, data, and the like are multiplexed in transport packets, so the signal division unit 320 divides and recombines the transport packets. Such division and recombination appears as a complicated aspect in a situation such as data broadcasting, but in this exemplary embodiment of the present invention, the division and recombination is limited to an audio signal and a video signal for convenience of explanation. The signal division unit 320 divides the broadcast signal output by the broadcast reception unit 310 into an audio signal and a video signal, transmits the audio signal to the audio decoding unit 330, and transmits the video signal to the video decoding unit 350.

The audio decoding unit 330 decodes the audio signal output by the signal division unit 320. The decoded audio signal is further processed by the audio processing unit 335. For example, the audio processing unit 335 removes audio noise from the decoded audio signal, or applies a particular audio effect to the decoded audio signal. The audio output unit 340 converts the signal output by the audio processing unit 335 into a final output format suitable for the speaker unit 345, so that the speaker unit 345 can output the audio.

The video decoding unit 350 decodes the video signal output by the signal division unit 320, so that a decompressed video signal can be output.

The video processing unit 355 further processes the video signal output by the video decoding unit 350. That is, the video processing unit 355 may process the video signal in order to enhance the image quality, add a graphic user interface signal such as a menu generated by the menu generation unit 360, convert the output resolution, or change an output video area.

The video output unit 365 converts the video signal output by the video processing unit 355 into a final output format suitable for the display unit 370.

The video processing unit 355, the menu generation unit 360, and the video output unit 365 are described in greater detail below with reference to FIGS. 4 and 5.

Figure 4:
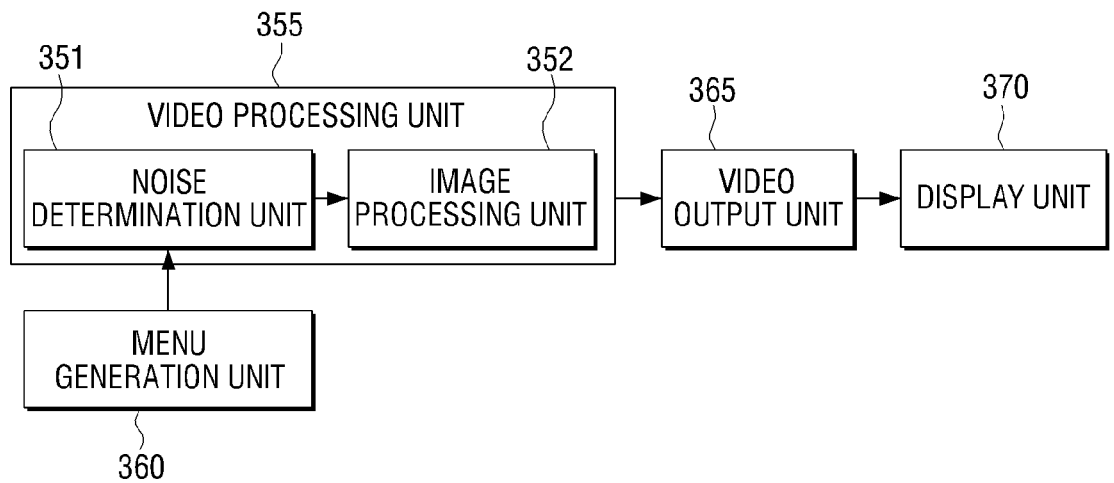
FIG. 4 is a detailed block diagram of the display apparatus of FIG. 3.

FIG. 4 is a block diagram illustrating the video processing unit 355, the menu generation unit 360, and the video output unit 365 in more detail.

The video processing unit 355 may include a noise determination unit 351 and an image processing unit 352.

The noise determination unit 351 determines whether there is noise on an edge of an original image. As illustrated in FIGS. 1 and 2, an edge of an original image indicates one of the four edges of the original image: the upper edge, the lower edge, the right edge, and the left edge, each of which is an area that is smaller than 10% of the original image. For example, if an original image has a resolution of 1920×1080, the edge area which is not larger than 108 pixels vertically or the edge area which is not larger than 192 pixels horizontally can be a noise. In order to determine whether there is noise on an edge of an original image, there are a method of automatically determining the presence and absence of noise, or a method of the user determining the presence and absence of noise using a menu generated by the menu generation unit 360. These methods will be described in detail with reference to FIG. 7. If noise is determined by the noise determination unit 351, the image processing unit 352 processes the noise. A detailed example of processing the noise will be described in detail with reference to FIG. 7. Description of the video output unit 365 and the display unit 370 is the same as that in FIG. 3.

Figure 5:
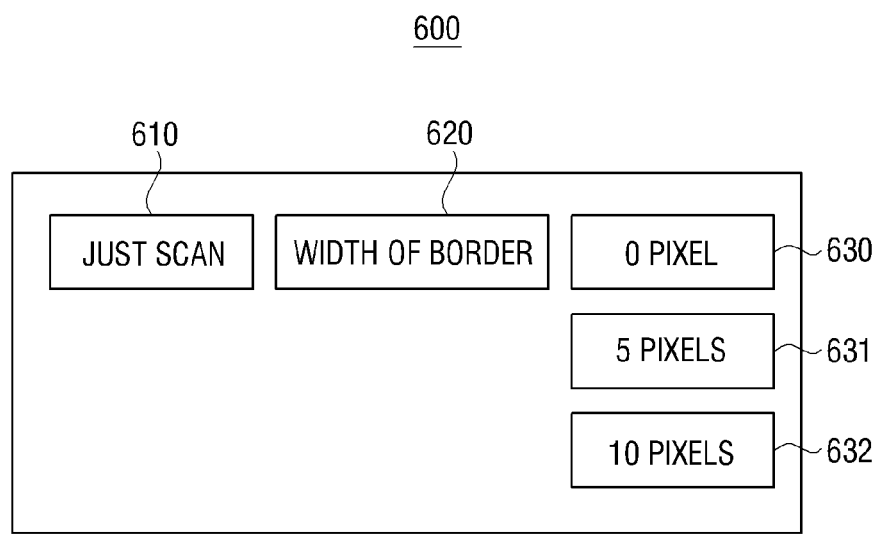
FIG. 5 illustrates an example of a menu screen according to an exemplary embodiment of the present invention.

FIG. 5 illustrates an example of a menu 600 generated by the menu generation unit 360 of FIG. 4.

A just scan 610 is one of the sub menus, and is activated if the user selects the just scan 610. A width of edge 620 is one menu of the just scan 610, and enables the user to select the width of a border. The width of a border may be of various values such as 0 pixel 630, 5 pixels 631, and 10 pixels 632, which is selected by the user. That is, the user may select 0 pixel 630 not to set an edge, or may set 5 pixels 631 for the upper edge, the lower edge, the right edge, and the left edge, or set 10 pixels 632 for the upper edge, the lower edge, the right edge, and the left edge. The width of a border can be equal to the size of a noise area.

Figure 6:
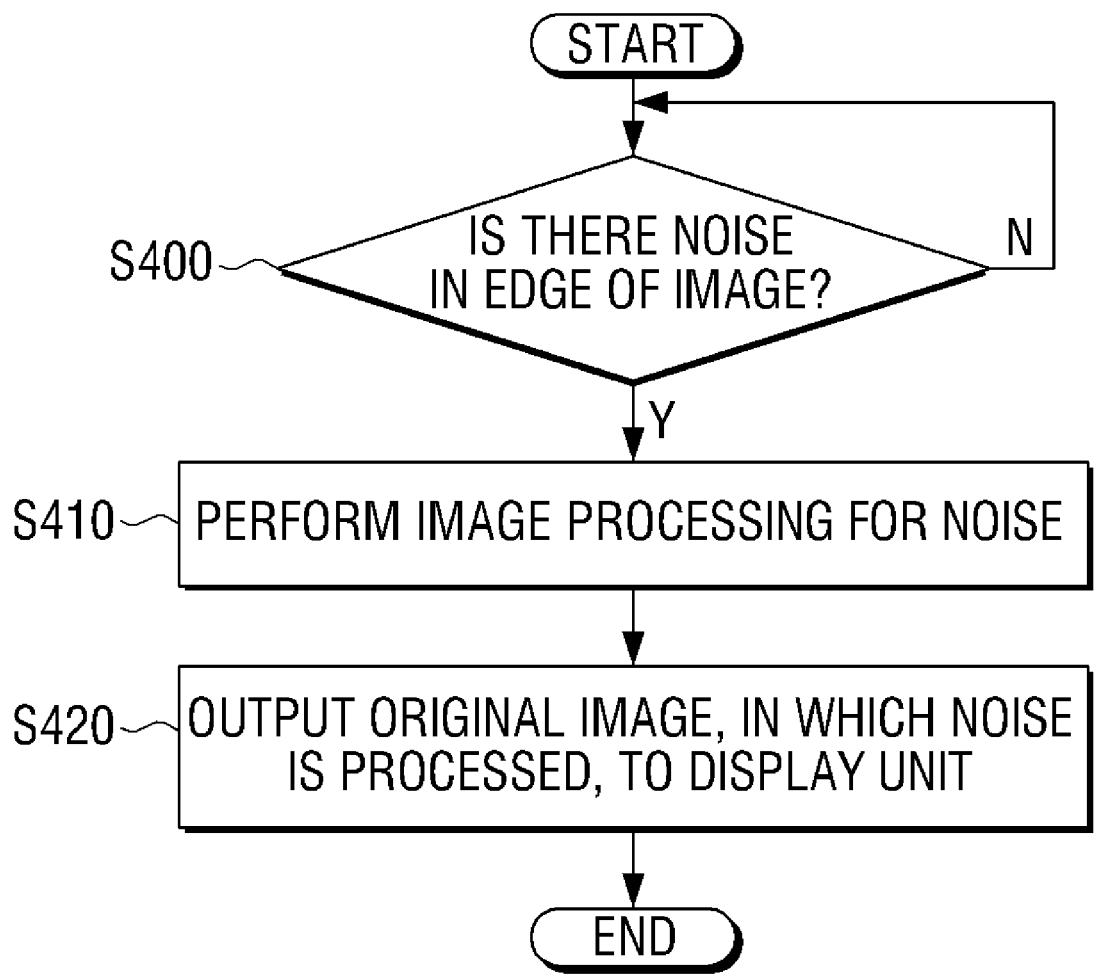
FIG. 6 is a flow chart illustrating an image processing method of a display apparatus according to an exemplary embodiment of the present invention.

FIG. 6 is a flow chart illustrating an image processing method according to an exemplary embodiment of the present invention.

In operation S400, it is determined whether there is noise on at least one edge of an original image.

As illustrated in FIGS. 1 and 2, an edge of an original image indicates the four edges of the original image: the upper edge, the lower edge, the right edge, and the left edge, each of which is an area smaller than 10% of the original image. For example, if an original image has a resolution of 1920×1080, the edge area which is not greater than 108 pixels vertically or the edge area which is not greater than 192 pixels horizontally can be a noise. In order to determine whether there is noise on an edge of an original image, there are a method of automatically determining the presence and absence of noise, or a method of the user determining the presence and absence of noise using a menu generated by the menu generation unit 360. These methods will be described in detail with reference to FIG. 7. In operation S410, if noise is determined in operation, the noise is processed. A detailed example of processing the noise will be described in detail with reference to FIG. 7. In operation S420, the original image in which the noise is processed is output to the display unit 370.

Figure 7:
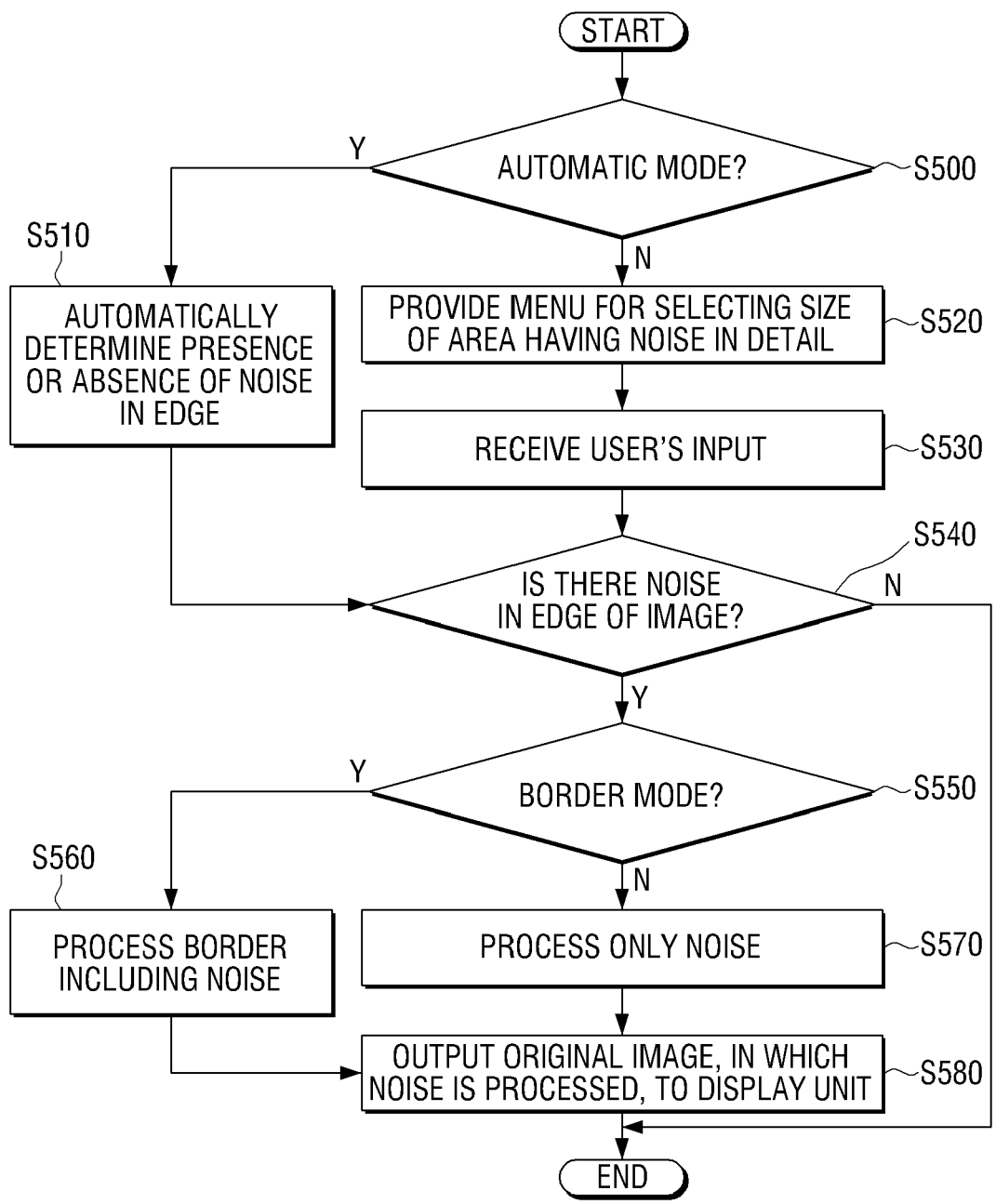
FIG. 7 is a flow chart illustrating an image processing method of a display apparatus according to another exemplary embodiment of the present invention.

FIG. 7 is a flow chart illustrating an image processing method of a display apparatus according to another exemplary embodiment of the present invention.

In operation S500, in order to determine whether there is noise on an edge of an original image, the user selects a method of automatically determining the presence and absence of noise, which is referred to here as an automatic mode, or a method of the user determining the presence and absence of noise using a menu generated by the menu generation unit 360. If the user selects the automatic mode, operation S510 is performed. If the user does not select the automatic mode, operation S520 is performed.

In operation S510, the presence and absence of noise is automatically determined as in the following exemplary embodiments. In one exemplary embodiment, in a certain area of an edge, if the brightness or a color information value corresponding to each pixel of several continuous preceding frames continues to vary greater than a predetermined value, the edge is determined to be noise rather than normal data. In another exemplary embodiment, in a certain area of an edge, if a specific pattern appears repeatedly, the edge is determined to be noise. For example, if a pattern, in which a vertical or horizontal line is detected almost as a black line, white dotted lines are repeated, and then a black line is detected, appears, the edge is determined to be noise generated in a modification of the broadcast or by broadcast equipment.

In operation S520, the presence and absence of noise is determined by the user's input rather than by the automatic mode. For example, if a menu is provided as in FIG. 5, the user can select a border of 0 pixel 630 if the user determines that there is no noise on the edges, the user can select a border of 5 pixels 631 if the user determines that there is noise only on the end of an edge, and the user can select a border of 10 pixels 632 if the user determines that there is more noise on an edge.

In operation S530, the user's input is received in response to operation S520.

In operation S540, it is determined whether there is noise on an edge based on the result of operation S510 or operation S530.

In operation S540, if it is determined that there is no noise on an edge, further image processing is not necessary. However, if it is determined that there is noise on an edge, noise can be reduced by processing the image. There are many image processing methods, but in this exemplary embodiment of the present invention, a method of hiding noise using a border or a method of processing the image of only an area having noise is described.

In operation S550, if a mode to set a border is determined, operation S560 is performed. Otherwise, operation S570 is performed.

In operation S560, the noise is hidden by setting a border on the edge of the image. Color of the border may be set using color similar to the edge of the image, or using softly varying color rather than a single color. For example, the chroma of the edge of the image can be gradually increased or decreased.

In operation S570, only noise is processed. There are many noise processing methods, but in this exemplary embodiment of the present invention, a method of repeating a preceding frame or one of adjacent pixel values, a method of taking an average based on a preceding frame or adjacent pixel values, or a method of taking an estimated value based on a preceding frame or adjacent pixel values are used.

In greater detail, a noise pixel may be adjusted to have a value of non-noise pixel, to have an average value of pixels in a certain area, or to have a pixel value of at least one preceding frame in the same location, so that noise can be removed.

Figure 8:
FIG. 8 is a display screen illustrating the image processing result of a display apparatus according to an exemplary embodiment of the present invention.

In operation S580, the processed original image is converted into an output format suitable for the display unit 370. Consequently, the user can view the original image in which the noise is removed, or in which an outline is generated to hide the noise as illustrated in FIG. 8.

An image processing and outputting apparatus and method of a display apparatus according to an exemplary embodiment of the present invention has been described with reference to FIGS. 1 to 8.

In the exemplary embodiment of the present invention, a DTV is described as an example, but the inventive concept of the present invention can also be applied to other display apparatuses such as computer monitors and cell phones.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image processing and outputting method, comprising:
    determining whether there is noise on at least one edge of an original image;
    image processing pixel data of the original image for the noise, if there is noise;
    outputting the processed original image, in which the noise is processed; and
    displaying the processed original image on a display device,
    wherein the displaying comprises displaying the processed original image including an overscan area in which the pixel data of the noise are image processed to remove the noise.

2. The method according to claim 1, wherein the determining operation comprises providing a user with a selectable menu regarding the noise.

3. The method according to claim 2, wherein the selectable menu comprises a menu for selecting a size of an area having the noise in detail.

4. The method according to claim 1, wherein the determining operation comprises automatically determining a presence of the noise or an absence of the noise on the at least one edge according to a predetermined criterion.

5. The method according to claim 4, wherein the automatically determining operation comprises determining whether a particular pattern appears in a certain area of the at least one edge.

6. The method according to claim 1, wherein the operation of image processing comprises converting only the noise into another image data.

7. The method according to claim 1, wherein the operation of image processing comprises converting a border including the noise into another image data.

8. The method according to claim 7, wherein the converting operation comprises receiving a width of the border from the user.

9. The method according to claim 7, wherein the converting operation comprises gradually increasing or decreasing a chroma of image data on the border.

10. A display apparatus, comprising:
a noise determination unit which determines whether there is noise on an edge of an original image;
an image processing unit which performs image processing on pixel data of the original image for the noise, if there is noise; and
a video output unit which outputs the processed original image, in which the noise is processed, to be displayed on a display unit,
wherein the display unit displays the processed original image including an overscan area in which the pixel data of the noise are image processed to remove the noise.

11. The display apparatus according to claim 10, further comprising:
a menu generation unit which provides a user with a selectable menu regarding the noise.

12. The display apparatus according to claim 10, wherein the noise determination unit automatically determines a presence of the noise or an absence of the noise on the edge according to a predetermined criterion.

13. The display apparatus according to claim 10, wherein the image processing unit converts only the noise into another image data.

14. The display apparatus according to claim 10, wherein the image processing unit converts a border including the noise into another image data.

15. An image processing method comprising:
determining if there is noise in an overscan area of an original image;
changing pixel data of the noise, if the noise is determined to be in the overscan area, into another pixel data; and
displaying the original image comprising displaying the overscan area of the original image including the changed pixel data, on a display device.

16. The image processing method of claim 15, wherein the determining is one of manually determining by a viewer if there is the noise and automatically determining by a processor if there is the noise.

17. The image processing method of claim 16, wherein the changing the pixel data comprises one of
adjusting the pixel data to have a value of non-noise pixel,
adjusting the pixel data to have an average value of pixels in a certain area, and
adjusting the pixel data to have a pixel value of at least one preceding frame in a location corresponding to a location of the pixel data of the noise.

18. The display apparatus of claim 10, wherein the edge of the original image is in the overscan area.

19. The display apparatus of claim 18, wherein the image processing unit adjusts the pixel data of the noise to have one of
a value of non-noise pixel,
an average value of pixels in a certain area, and
a pixel value of at least one preceding frame in a location corresponding to a location of the pixel data of the noise.

* * * * *